C. T. RICHMOND.
METHOD FOR MOLDING BODIES FROM PLASTIC MATERIAL.
APPLICATION FILED FEB. 23, 1912.
1,161,249.
Patented Nov. 23, 1915.
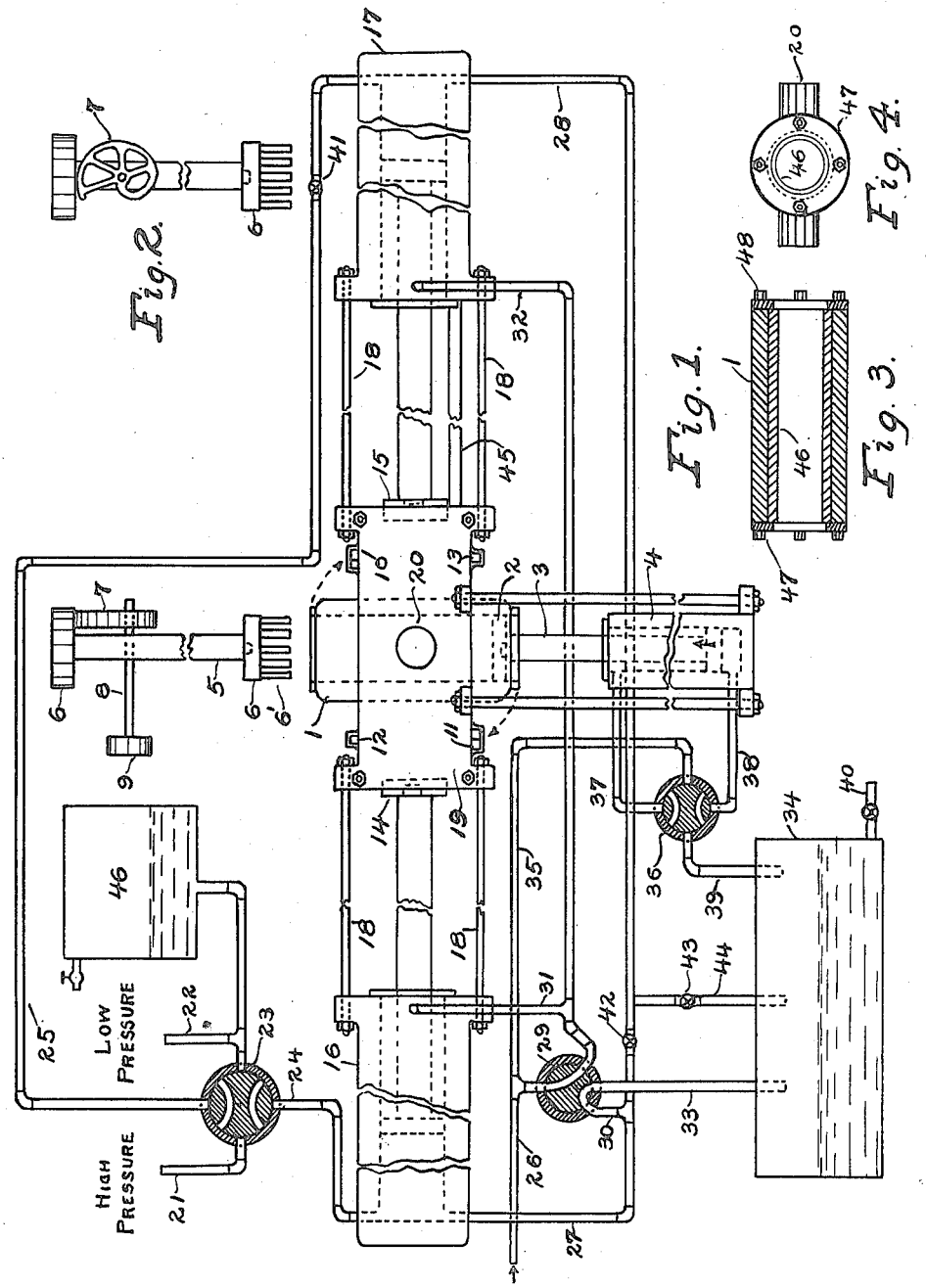
WITNESSES
H. G. Grover
C. T. Bechler
INVENTOR
CHARLES T. RICHMOND
BY Ira J. Adams
ATTORNEY

UNITED STATES PATENT OFFICE.

CHARLES T. RICHMOND, OF CLEVELAND, OHIO, ASSIGNOR TO NATIONAL CARBON CO., OF CLEVELAND, OHIO, A CORPORATION OF NEW JERSEY.

METHOD FOR MOLDING BODIES FROM PLASTIC MATERIAL.

1,161,249.  Specification of Letters Patent.  Patented Nov. 23, 1915.

Application filed February 23, 1912. Serial No. 679,327.

*To all whom it may concern:*

Be it known that I, CHARLES T. RICHMOND, a resident of Cleveland, in the county of Cuyahoga, in the State of Ohio, have invented new and useful Improvements in Methods for Molding Bodies from Plastic Material, of which the following is a clear and exact description.

My invention is an improvement in means and methods for molding bodies from plastic material.

While the invention can be used to mold bodies from any plastic material whatever, it is particularly useful for molding large electrodes from a carbon mixture In forming small bodies from a carbon mixture or any other material it is the usual practice to force the plastic material or "mud", as it is called, through a small die the size and shape of the body to be formed. The pressure of the piston in the large mud cylinder forces the material out through the die, and since this die is small the material forced through it is substantially equally impeded in its travel. The small body therefore is subject to substantially uniform pressure and is substantially of equal density throughout its cross section.

It might appear at first thought that large bodies could be molded by increasing the size of the outer cylinder and the size of the die in proportion to the size of the body to be formed. This, however, cannot be done for the following reasons. When the size of the die is increased the friction of its sides may impede the progress of the plastic material sufficiently to compact the outer portions of the electrode or other body to the desired density. The inner portions of the large electrode or body however, are not greatly impeded by the friction against the die, and the material is forced through the central part of the die at a greater rate and at a lower compression. Since there is very little resistance to the flow of the material through the center of the die, the central portion of the electrode or body will be hardly compressed at all, and as it will travel faster than the outside portions, there will be a sort of core formed with occasional crevices extending to the outer surfaces. Experience has thus proven that large bodies of certain plastic material cannot be forced through dies and be compressed into a uniform density. In some cases it might be possible to force the bodies successfully if the mix were made drier, or if the binding material were reduced. Carbon mixes especially require a certain amount of binder to enable the electrodes or other bodies to bake into a tough adherent mass. When the plasticity of the mix is reduced beyond certain well-known limits in order to get greater density from the friction through large dies, the forced body does not make a good merchantable article after being baked or finished. One of the known ways of forming large bodies of plastic material that are required to be of uniform density is to tamp the material in the mold so that all parts of the body are equally tamped and compressed. This is a slow process and the results obtained are not entirely satisfactory. One inherent defect of the tamped electrode is that surfaces are formed in tamping. When the first batch of mix is put into the mold and tamped, a surface is formed that does not always perfectly unite with the next batch that is tamped on top of the first. The second tamping will of course form another surface that may unite imperfectly with the third. Thus the tamped electrode is liable to be formed of a series of imperfectly united sections. My invention aims to do away with this slow and unsatisfactory process, and to admit of quick molding of large bodies with uniformly high density.

In the drawings: Figure 1 is a more or less diagrammatic illustration of the hydraulic press in accordance with my invention. Fig. 2 is an end view of the cam mechanism which raises the plunger or tamper. Figs. 3 and 4 are details of the mold.

Referring to Fig. 1, the mold in which the body is to be compressed is denoted by 1. The ram or piston head 2 on the rod 3 closes the lower opening in the mold 1. The piston rod 2 is raised and lowered by means of the hydraulic device 4, though it may be raised by any other power. The plastic material is fed into the upper end of the mold or cylinder 1, and is tamped in by the plunger 5 having a head 6 with pegs 6'. The cam 7 on a shaft 8 raises the plunger or tamper 5 as will be evident on referring to Fig. 2. The shaft 8 is rotated by a pulley or connected to any source of power whatever. Once in every revolution of the cam 7 the plunger will drop and pack the material in the mold 1, and will then be raised by the cam 7 to the position shown in Figs. 1 and 2. The plunger is thus raised and lowered once during each rotation of the shaft 8. The cam 7 may be made of any shape and size to give the desired stroke of the plunger.

When the cylinder 1 is substantially filled with the material, lock pins 10, 11 are removed so that the cylinder can be revolved in a clockwise direction. The pins 12 and 13 stop the rotation of the cylinder when the hole therein is in alinement with the rams or piston heads 14 and 15. The lock pins 10 and 11 are then replaced, and the cylinder is firmly locked in alinement with the compression pistons. Prior to the rotation of the cylinder 1 the piston head 2 is moved downward by means of the ram 4. The piston heads 14 and 15 are moved by hydraulic pressure exerted in cylinders 16 and 17 respectively. These cylinders are securely fastened together through the rods 18 and member 19. The cylinder is pivoted between the two bars 19 by means of the pivot or trunnion 20.

21 indicates a pipe connected to high pressure which may be 4000 pounds per square inch or more depending on the size of the electrode and the density to which it is to be compressed.

22 is a pipe connected to a lower pressure which may be 1000 pounds per square inch less than the high pressure. However, the pressure in the pipes 21 and 22 may be any desired value. These pressures will be varied in accordance with the work to be done.

23 is a valve for connecting either high or low pressure to the pipes 24 and 25. Pipe 24 connects with the back part of the ram cylinder 16, while pipe 25 connects with the rear end of ram cylinder 17. Pipe 26 is connected to some source of low pressure. This pressure need only be sufficient to move the piston heads 14 and 15 backward so that the cylinder 1 can be revolved back into the position shown in Fig. 1, as will be explained further.

27 indicates a pipe also connected to the back end of the cylinder 16. A similar pipe 28 is connected to the back end of cylinder 17. These two pipes are joined together and are connected to a valve 29 by means of a pipe 30. The pipe 26 is also connected to the valve 29. This valve is for connecting the low pressure in the pipe 26 to the pipes 31 and 32 connected to the front end of the cylinders 16 and 17. Exhaust pipe 33 connects the valve with a waste tank 34. Low pressure in pipe 26 is also connected through pipe 35 to a valve 36. Pipes 37 and 38 connect the valve 36 with the upper and lower end respectively of the cylinder 4. A pipe 39 connects the valve 36 to the waste tank 34.

The operation of the hydraulic press is as follows: When the cylinder 1 is revolved and locked in position by the pins 10 and 11 as previously explained, the valve 29 is turned in position to close the two pipes 30 and 26 and to connect pipes 31 and 32 with the exhaust pipe 33. Then the valve 23 is turned from closed position shown in the drawing so as to connect the high pressure pipe 21 to the pipe 24 and the low pressure pipe 22 to the pipe 25. High pressure will thus be admitted to the cylinder 16, and low pressure will be admitted to the cylinder 17. Piston heads 14 and 15 will then be forced forward compressing the material in the mold 1. When a certain point in the pressure is reached the low pressure piston head will cease to travel forward, and will be forced backward by the high pressure piston head 14. The attendant will watch the progress of the piston heads and just before the piston head 15 is forced out of the cylinder 1, he will reverse the valve 23 so that low pressure is admitted to the pipe 24, and high pressure to the pipe 25. Piston head 15 will then be forced forward by the high pressure while piston head 14 will be forced backward by the high pressure piston. This process is continued forcing the body first in one position and then in the other, and by this means the electrode or other body being formed is densely compressed through all its portions.

The low pressure pipe 22 is connected to a magazine or tank 46 to serve as a storage means for the water forced back through the pipe by the high pressure piston. The tank contains air at a certain pressure to keep the water pressure approximately constant. Such equalizing means is old in the art, and since it is no part of my invention there is no necessity for further description.

When the material in the mold 1 has been reciprocated, and compressed to the desired density, the valve 23, is returned to the closed position shown in Fig. 1. The valve 29 is also returned to the position shown in Fig. 1. The pressure in pipe 26 is then connected to pipes 31 and 32, while pipes 27 and 28 are connected to exhaust pipe 33. The pistons in cylinders 16 and 17 are forced back by the low pressure, and water on the side of the piston heads is exhausted into the tank 34. The pins 10 and 11 are then removed and the cylinder 1 is rotated counter-clockwise into the position shown in Fig. 1. Valve 36 is turned so that pipe 35 is connected with pipe 38 and pipe 37 is connected with exhaust pipe 39. The low pressure then forces the head 2 upward and forces the compressed body out of the cylinder 1. When the body is forced out the tamper 5 will be in the upper position so that there will be sufficient room for its removal. The tamper 5 is shown near the cylinder 1 in the upper stroke, but this is only to enable the entire drawing to be placed in one figure. It will be understood that the tamper 5 will be raised to a sufficient height to enable it to accumulate enough momentum to tamp the material in the cylinder 1. This height is sufficient to allow the body to be forced from the cylinder by the ram 4. The water exhausted from pipes 33 and 39 can be pumped out through pipe 40 by the hydraulic pump and used over again. The body need not be removed from the cylinder 1, however, by rotating it back into the vertical position. After it is compressed to the desired density, valve 41 in pipe 25 and valve 42 in pipe 28 is closed, and valve 43 in pipe 44 is opened. The valve 23 is then opened a sufficient amount to force the body slowly out of the cylinder 1 by means of the ram 16. A platform 45 is shown between the member 19 and cylinder 17 to support the body as it is forced out of the cylinder. The molded body may then be removed from the platform or table in any manner. If the formed body is not strong enough to force the ram head 15 backward, valve 29 can be turned to admit low pressure from pipe 26 to cause the ram head to retreat. It will be evident that the rams 16 and 17 will have to be substantially twice as long as the mold in order to do this. If the ram 4 is used to force out the compressed body the rams 16 and 17 need not be as long as the mold. When the material in the cylinder 1 is being compressed, and also when the pressure is being admitted to the ram 4, the valves 41 and 42 are in the open position and the valve 43 is in the closed position. These valves are changed only when it is desired to force the compressed body out of the cylinder by means of the high pressure piston.

While I have shown mechanical means for the initial tamping of the material in the cylinder, it must be understood that such is not essential to my invention, as it can be tamped in by hand or by any other means.

I have shown three separate valves, 23, 29, and 36 in order to make the operation clear, however, these three valves can be all fastened together, so as to be moved in unison, and they may also be combined into one valve with a plurality of pipes connected thereto.

Figs. 3 and 4 show respectively a section and an end view of the mold 1 with a sleeve 46 therein. If it is desired to form bodies of less size than the bore of the mold itself, reducing sleeves are placed inside the mold. These sleeves may have a bore of any diameter and round, square or any other shape. The size and shape would be made to correspond to that of the desired article. The sleeve is retained in place by a cap plate 47 held in place by any means such as screws 48 for instance. By the use of the sleeves various sized and shaped bodies can be formed with one mold.

Having described my invention what I claim is:

1. The method of compacting a plastic mass in a mold which consists in applying unequal pressures to the two ends of the mass whereby the greater pressure moves it in the mold against the less pressure.

2. The method of compacting a plastic mass in a mold which consists in simultaneously applying unequal pressures to the ends of the mass and interchanging the pressures after a time interval whereby it is compressed and moved through the mold first in one direction and then in the other.

3. The method of compacting a plastic mass in a mold which consists in alternately applying a pressure to the ends thereof whereby the mass is moved first in one direction in the mold and then in the other.

In testimony whereof I have hereunto signed my name.

CHARLES T. RICHMOND.

Witnesses:
F. D. LAWRENCE,
H. E. HACKENBERG.